Dec. 26, 1950  C. E. MAYNARD  2,535,436
ART OF MOLDING THERMOPLASTIC MATERIAL
BY THE INJECTION MOLDING METHOD
Filed Nov. 28, 1947  5 Sheets-Sheet 1
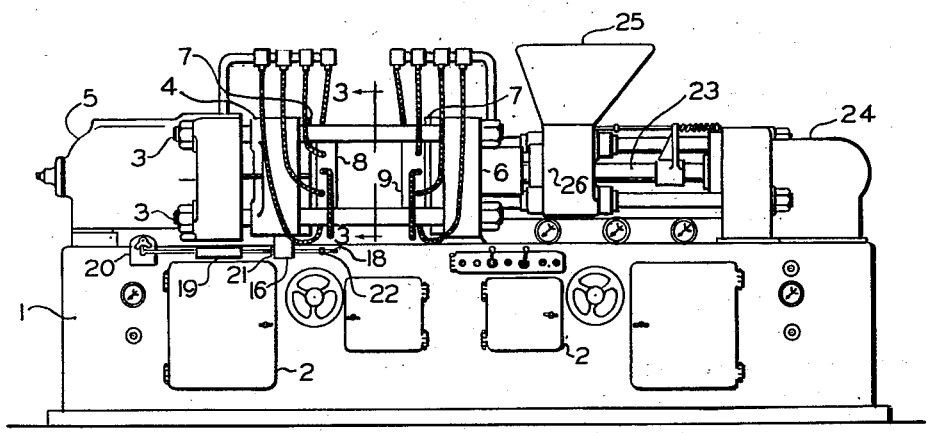
FIG. 1
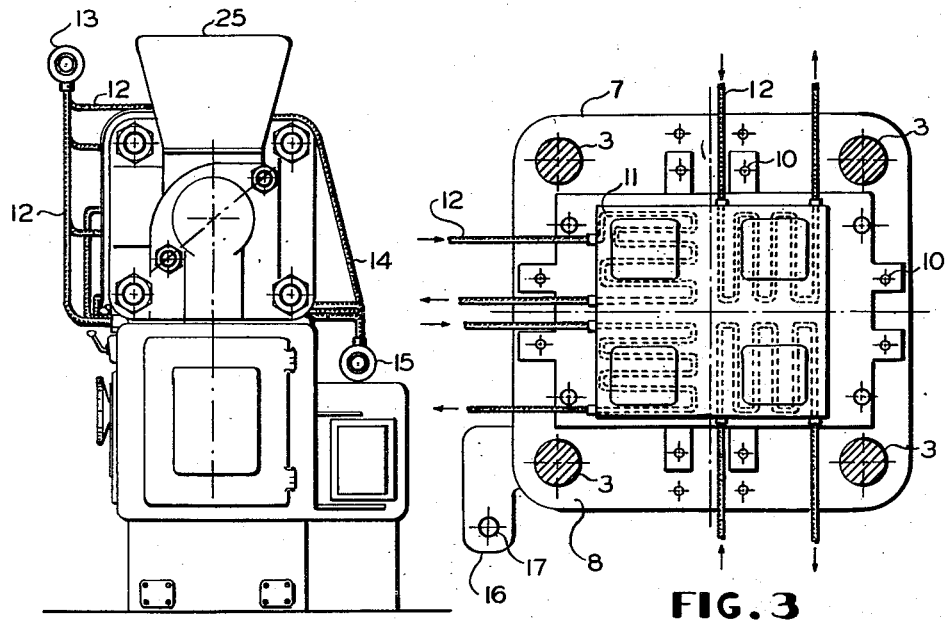
FIG. 2
FIG. 3
INVENTOR
CHARLES EDGAR MAYNARD
BY
Chapin & Neal
ATTORNEYS Dec. 26, 1950 C. E. MAYNARD 2,535,436
ART OF MOLDING THERMOPLASTIC MATERIAL
BY THE INJECTION MOLDING METHOD
Filed Nov. 28, 1947 5 Sheets-Sheet 2

INVENTOR
CHARLES EDGAR MAYNARD
BY
Chapin & Neal
ATTORNEYS

INVENTOR
CHARLES EDGAR MAYNARD
BY
*Chapin & Neal*
ATTORNEYS

Patented Dec. 26, 1950

2,535,436

UNITED STATES PATENT OFFICE 2,535,436

ART OF MOLDING THERMOPLASTIC MATERIAL BY THE INJECTION MOLDING METHOD

Charles Edgar Maynard, Florence, Mass., assignor to The Pro-Phy-Lac-Tic Brush Company, Florence, Mass., a corporation of Delaware Application November 28, 1947, Serial No. 788,486

3 Claims. (Cl. 18—55)

This invention relates to improvements in the art of molding thermo-plastic articles by the injection molding method.

The injection molding method is in general use for making articles of the plastics commonly called thermo-plastics. These are the ones which are commonly heat plasticized, molded hot, and then set to molded form by cooling. Such thermo-plastics do not include the thermo-setting plastics, and the improved method to be disclosed is for molding articles of the defined thermo-plastic character which will set upon cooling alone.

It is a common practice to carry on the prior art injection molding method by the use of automatic injection molding machines. They have been highly developed are in wide use, and evidence the prior art methods which methods are to be improved by this invention.

The purpose of the invention is to provide a new method of molding by the use of an automatic injection molding machine so that the articles of a given size may be made faster or of more uniformly high quality or both faster and of better quality.

Another purpose is to provide a new method feasible to mold substantially larger articles than have been considered feasible to make by the use of the injection molding machines.

The way the above purposes of the invention are carried out will be disclosed with the help of the accompanying drawings, and details will be explained and discussed to make the invention clear.

In the drawings:

Fig. 1 is a front elevation of an automatic injection molding machine of the horizontal injection molding press type, shown equipped with one form of suitable control apparatus for practicing my invention method, such apparatus contained for the most part inside of the machine, but generally indicated by the manifolds and flexible hose seen leading to the mold halves;

Fig. 2 is a side elevation of the machine and control apparatus shown in Fig. 1, but drawn to larger scale;

Fig. 3 is a section taken on line 3—3 of Fig. 1 showing the movable half of a four cavity mold and flexible hose connections to cored out passageways behind the mold cavities;

Figure 4:
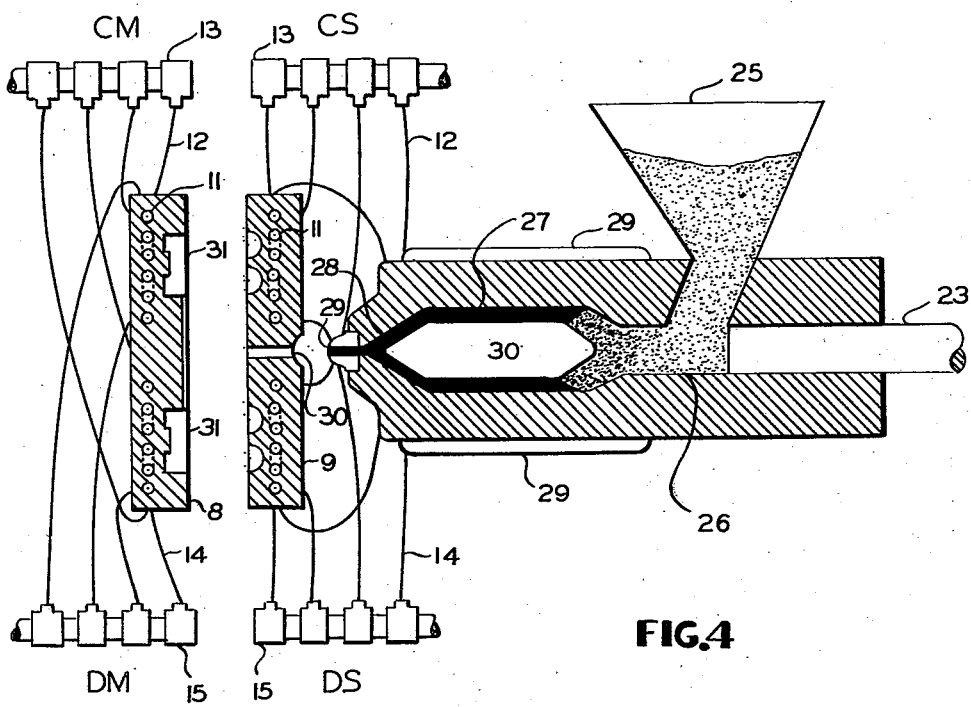
Fig. 4 is a diagrammatic elevation in vertical section taken through the center of the machine and through the nearer of the four mold cavities, with connections indicated from the inlet manifolds and to the drain manifolds.

The automatic injection molding machine, shown in Figs. 1 and 2 has a base 1 with several hinged doors 2 to provide access to the hydraulic power unit, oil reservoir, piping, wiring and various controls contained within. Removable steel tie rods 3 guide a clamp platen 4 and a ram in cylinder 5 moves this platen 4 into closed and open positions with relation to a die head plate 6, which is securely bolted to the base of the machine. Bolster plates 7 surface both clamp platen 4 and die head plate 6.

Mold halves 8 and 9 are fastened to bolster plates 7 by a plurality of studs 10 (Fig. 3). These mold halves 8 and 9 are cored out, or channeled, to provide fluid passageways 11 for heating and cooling the mold. Connecting to passageways 11 are flexible tubes 12 leading from inlet manifolds generally designated by the numeral 13 (Fig. 2) and specifically designated by the letters CS (Fig. 4) for that inlet manifold connecting to the stationary mold half 9, and CM for that inlet manifold connecting to the movable half 8 of the mold. Flexible tubes 14 lead to drain manifolds which are generally designated by the numeral 15 and specifically designated by the letters DS for that drain manifold serving the stationary mold half 9, and DM for the drain manifold of the movable mold half 8.

Movable mold half 8 has a projection 16 (Fig. 3) containing hole 17, into which slidably fits rod 18 (Fig. 1). Rod 18 is held onto base 1 by a bushing 19 through which it may slide and trip limit switch 20 whenever projection 16 forces such movement by abutting and pushing against nut stops 21 or 22. This mechanical linkage to operate limit switch 20 will be further disclosed, together with the function of limit switch 20, in the explanation of the electrical part of the control system to later follow.

The hydraulic injection unit consists of a ram 23 working in a smooth bored cylinder 24 (Fig. 1). A hopper 25 provides access to feed chamber 26, and ram 23 acts as an injection plunger (Fig. 4) to force material into heating chamber 27, through injection chamber 28 and into mold halves 8 and 9. This is the common injection unit, however material may be plasticized by internal heat generated by friction as the material is kneaded in a mixing chamber just below the hopper and the plasticized mass dropped through a bottom gate of the mixing chamber directly in the path of the ram 23 to be forced into the mold. This method of plasticizing is more thoroughly explained in my allowed pending application, Serial No. 591,910, filed May 4, 1945, now Patent No. 2,442,368.

The common art method of plasticizing is shown in Fig. 4 wherein granules of raw thermoplastic material put into hopper 25 are plasticized in heating chamber 27 by heat from heating unit 29 and torpedo 30 as the material is forced through by ram 23 but said allowed pending application way is preferred for large size injection charges.

Molding compounds commonly referred to in the industry as thermo-pastics generally are synthetic organic materials of the following character: (1) their chief component is a resinous or cellulose-derivative binder; (2) at some stage of their use they are plasticized, i. e. either capable of being shaped or capable of being cast, and at some subsequent stage assume a more or less rigid condition; and (3) they have the common property of softening by reheating thus permitting them to be remelted and remolded. The acetates and vinyls are examples of thermo-plastics.

In the diagrammatic view of the injection molding machine (Fig. 4) granules are shown plasticized in heating chamber 27 and the mold open. As noted above, mold half 8 is the movable half of the mold in the molding operation and mold half 9 is the stationary half. Inlet manifolds CM and CS are shown in Fig. 4 with flexible tubes 12 diagrammatically indicated as connecting to cored out passageways 11 of mold halves 8 and 9 respectively. In like manner drain manifolds DM and DS connect to the mold halves by diagrammatically indicated flexible tubes 14.

When the mold is in closed position and locked, the homogenous, plasticized mass is forced by ram 23 through nozzle 29 into orifice or sprue 30 of the mold and through its runways into mold cavities 31. In molding, the steps of a complete cycle are: to close the mold; inject the material; let the material set; open the mold; and eject the molded piece. In the conventional molding method ram 23 is used after injection to hold pressure on the material until it sets, after which the ram is withdrawn, the mold opened and the work ejected. Temperature of the mold throughout the entire molding cycle is maintained constant.

In contrast with the prior art routine molding practice, which considers a substantially constant mold temperature highly desirable, I propose to vary the mold temperature in a particular way during each molding cycle. The temperature variation for the mold is timed in my method for special purposes with relation to the periods of a molding cycle. The diagram in Fig. 5 indicates the periods of an injection molding cycle of a machine such as is being considered and the new method of temperature variations for the mold integrated and related to such periods and cycle as shown by the temperature line or curve.

The periods are (a) mold closing time, (b) injection time, (c) plastic setting time while the plunger or ram pressure is held on the material, (d) plastic setting time while the plunger is being withdrawn and the already set sprue is holding the pressure within the mold cavity in order that the material may set further before opening the mold, (e) mold opening time, (f) article removing time.

The temperature line for the time periods indicates the nature and relation of the new and useful temperature changes for the mold to those time periods. The temperature line would be different than that shown except for the practical consideration of not being able to cause temperature changes in the mold material to follow a better line, which might be done if only theory needed to be considered. As it is the temperature line indicates a continuation of the high mold temperature during the period b. The period a is used in the final step to get up to the high temperature of the mold. Both periods c and d are setting or chilling periods. When period b ends, the mold temperature begins (is made) to drop. The mold is chilled or refrigerated for this purpose until about the end of period c or until it is certain that the sprue is set to hold the pressure and begin the period d when the pressure plunger begins to draw back. At or around this time, the mold begins (is made) to heat to have it hot enough to time in with the beginning of period b in the succeeding cycle.

Consider that a relatively long time is available to get the mold heated from its low temperature point to its high point to begin period b again. There are the time periods d, e, f and a as the temperature line shows. From the curve of this line it will be seen that the average temperature of the mold for the time periods c and d is a much lower temperature than the high temperature in period b. This average can be made as low as it is practical in order to "pile" the refrigerating effect into the mold during period c.

Figure 5:
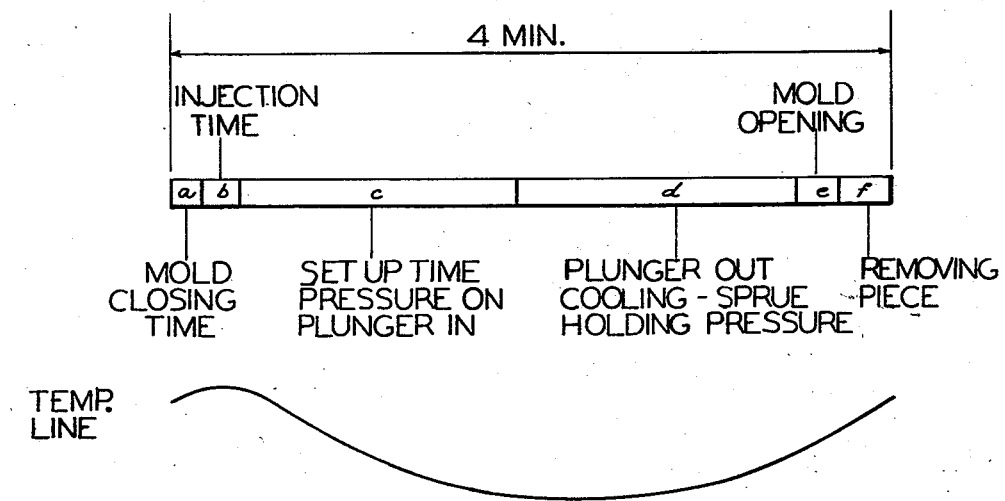
Fig. 5 is a graphic diagram indicating the periods of the injection molding cycle of an automatic injection molding machine such as illustrated in the foregoing figures and showing the temperature changes, as called for in the invention, related to the periods.

As an example which is substantially correct, the time line of 4 minutes in Fig. 5 may be considered as that for a cycle to mold by the new method a plastic hair brush back and handle, the back being one of rather large cross section. The periods are marked off in substantially correct relation. In the prior art, in which the mold temperature is kept at what the operators call their constant temperature, a comparable cycle would be substantially longer. Consider first the substantially longer cycle time of the prior art, and consider the periods as marked off in the diagram as taking up substantially the correct proportions of the prior art cycle time. One object of the new invention is to shorten the prior art cycle time by a new kind of temperature control of the mold under the special circumstances mentioned above. This is done by varying the mold temperature during the cycle. The molding steps are then as follows: To close the mold; inject the material which has been raised to its molding temperature at a time when the mold temperature is substantially higher than the setting temperature of the material; set the material by cooling the mold; open the mold; eject the piece and close the mold; heat the mold and repeat the cycle. The time periods a, b, e, f, are not changed. These four, however, are all relatively short time periods. Far more than half of the time of the complete cycle is seen in periods c and d. Together periods c and d make up the relatively very long plastic setting time upon which the beginning of recycling must wait. Considering these facts, it should be clear that the mold temperature for the critical but short operation period b, a period when a high mold temperature will avoid defects in the product, can be held high while the long periods c and d can be carried on to advantage with a mold temperature averaging much lower. This time saving will not interfere in any way with the quality of the product molded. It will allow the time of the cycle to be cut down substantially and makes feasible the use of a higher than usual temperature for period b. As previously stated the usual temperatue for the mold for this period is no higher than that of any other period since the temperature of the mold is maintained substantially constant, usually below 140 deg. Fahr., throughout the entire cycle. The importance of having the mold at a temperature substantially higher than the setting temperature of the material at the time of injection is to assure quality molding and prevent a stratification effect within the material as warmer internal portions of flowing plastic move past portions more external which have set by contact with relatively cold mold cavity surfaces.

The prior art time line for the plastic hair brush back and handle can be cut about twenty per cent or more even though the mold temperature during period b is substantially higher than the temperature normally maintained in conventional molding practice. In conventional molding, thermo-plastic material in the "fluid" or plasticized state literally freezes on striking the relatively cold mold. By having the mold temperature for period b, the time period of the injection operation in the cycle, in my method substantially higher than the setting temperature of the material, the flow of material into the mold for articles of large size and cross-section will be assured. The higher than usual mold temperature of the new method invention during this period will prevent the mold walls from causing any substantial chilling of the hot plastic flowing into the cavities. "Weld lines," formed when an outer layer has chilled and set before an inner layer, will be avoided. "Weld lines" are so named because when the inner layer sets it shows a weld with the previously set layer. Time is saved getting the material into the mold and by speeding up the "setting" or chilling once the material is inside the cavities.

In the time of chilling, when the mold temperature is lowered for the chilling period of the cycle, the plastic material is under static pressure in the mold. Of course, the setting of the material will be progressively from the cavity walls inward until the article has completely set. During such chilling, however, no part of the material is flowing as it is during the injection period. Consequently there are no "layers" of strain between material moving forward inside and particularly no chilled material on the outside to cause a "drag" and relatively different speeds of flow between "layers." The new plan is to get all the plastic into the mold cavities to completely fill them without enough heat loss to the mold walls for any chilling effect to set up "weld lines." This is preferably accomplished by the same or a slightly higher mold temperature than that of the plasticized material entering the mold. Only after the cavities are completely filled is the chilling effect applied to set or freeze the perfectly still material. The effect is analogous to freezing water when it is perfectly still, that is, to make clear, transparent ice with absence of signs of internal strain.

Figure 6:
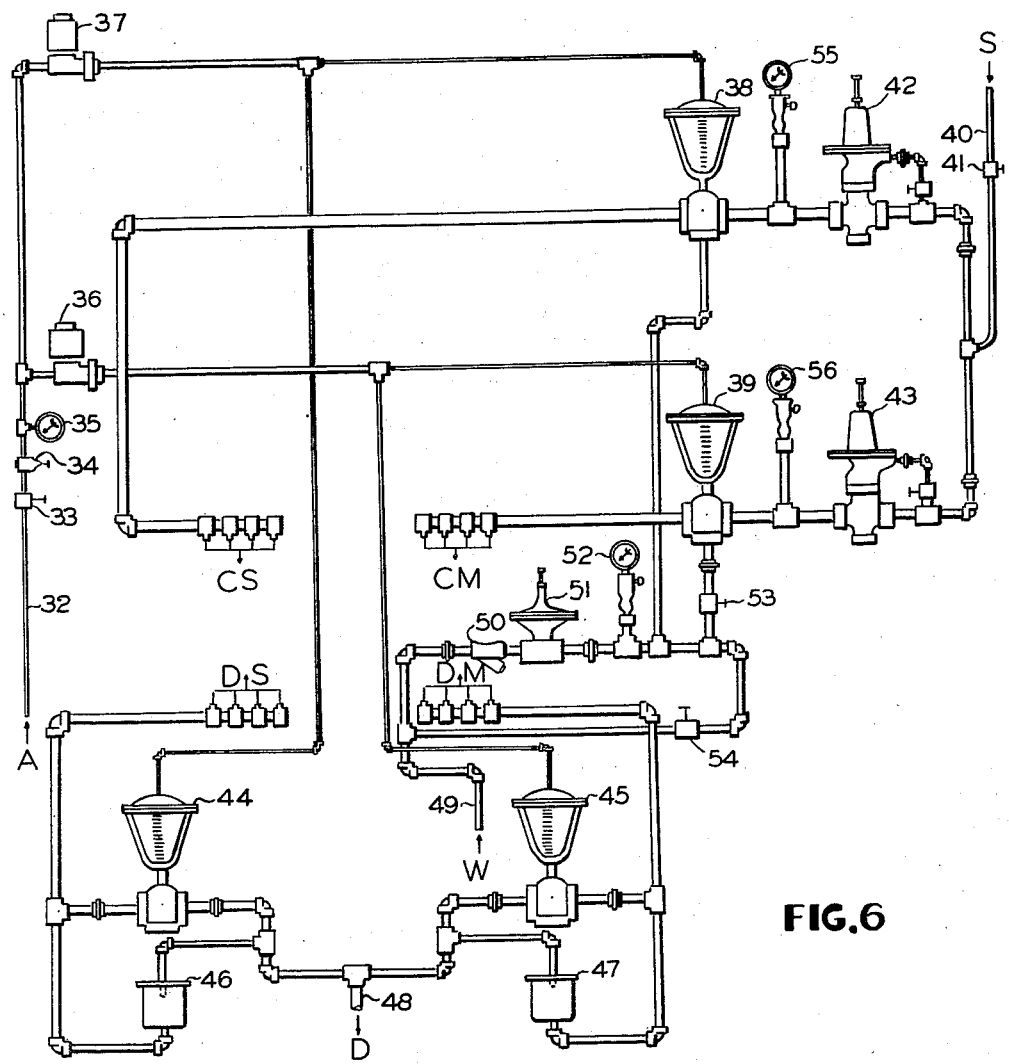
Fig. 6 is a piping diagram of a control apparatus suitable for practicing my invention.

A piping diagram for a control apparatus to provide heating of the mold in accordance with the temperature line of Fig. 5 is shown in Fig. 6. The function of the apparatus indicated in this diagram is to carry heating and cooling fluid to the cored mold halves in accordance with the molding period-temperature relation of the invention. At the time the mold is being heated to the right temperature for receiving the material, which temperature is one substantially higher than the setting temperature of the material, as the temperature is rising, the mold cooling fluid is turned on. Turning on the cooling fluid before the temperature reaches the right temperature for receiving the material is a practical necessity. This anticipation is necessary because the mold cannot instantly be reversed from temperature rise to temperature fall. So, by turning in the cooling fluid early, the temperature rises until the right injection temperature is reached, the mold is filled, and the temperature starts to fall as the injection step is completed. Although the cooling fluid starts to enter much earlier, the actual reversal from rising to falling temperature occurs at substantially the moment the mold is completely filled. Similarly, other changes in mold temperature are controlled so there is substantially no time lost by temperature lag.

Figure 7:
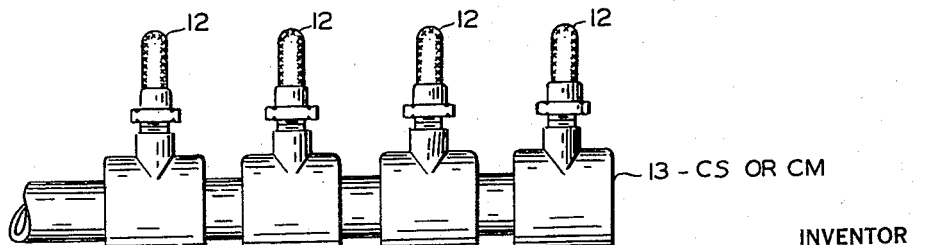
Fig. 7 is a side elevation of one of the four manifolds indicated in the several views.

In the piping diagram (Fig. 6), to heat the mold, compressed air enters air line 32 at A, goes through "shut-off" globe valve 33, pressure reducing valve 34 (if necessary) operating air pressure gage 35, and on to solenoid operated air valves 36 and 37. The solenoids of valves 36 and 37 being energized and these valves open, air goes to diaphragm operated valves 38 and 39. Valves 38 and 39 are three-way valves and one of their ports is opened by the air pressure compressing their diaphragm spring so that steam, entering line 40 at S may go to the mold. Steam from line 40 going to the mold passes through "shut-off" gate valve 41, is reduced from boiler pressure to proper mold heating pressure by pressure reducing valves 42 and 43, operates pressure gages 55 and 56 and goes through the open three-way valves 38 and 39 to inlet manifolds CS and CM, finally reaching the mold through flexible tubes 12 (Fig. 7). Air coming through open solenoid operated valves 36 and 37 closes the diaphragm operated one-way valves 44 and 45 so that steam passing through the mold and entering drain manifolds DS and DM is by-passed through steam traps 46 and 47 to main drain 48 at D.

To cool the mold, solenoid operated valves 36 and 37 are closed by de-energizing their solenoids thus shutting off air presure to diaphragm operated three-way valves 38 and 39 and diaphragm operated one-way valves 44 and 45. Steam is prevented from reaching the mold by the closing of the steam entrance port in three-way valves 38 and 39. Water, or other cooling fluid, entering line 49 at W, goes through strainer 50, pressure reducing valve 51 operates pressure gage 52 and goes through the open water port of three-way valves 38 and 39 to the mold. Emergency shut-off valves 53 and 54 are provided in the water line. Water enters the mold from inlet manifolds CS and CM through flexible tubes 12 and leaves by similar flexible tubes 14 to open drain manifolds DS and DM. One-way valves 44 and 45 being open when air pressure is shut off by solenoid operated valves 36 and 37, water from drain manifolds DS and DM passes through these valves 44 and 45 to main drain 48 without the necessity of going through steam traps 46 and 47.

The solenoid operated valves 36 and 37, diaphragm valves 38, 39, 44 and 45 and the pressure reducing valves 42 and 43 may all be of standard type and the construction of valves of such character are believed sufficiently well known to render a detailed description of them unnecessary.

Electric timers automatically energize and de-energize the solenoids of air valves 36 and 37 to cause the admitting of heating and cooling fluids (steam and water) respectively to the mold, in order to effect the useful temperature changes desired. These timers may be set to obtain the proper temperature curve according to the material or object being molded under the method of this invention.

Figure 8:
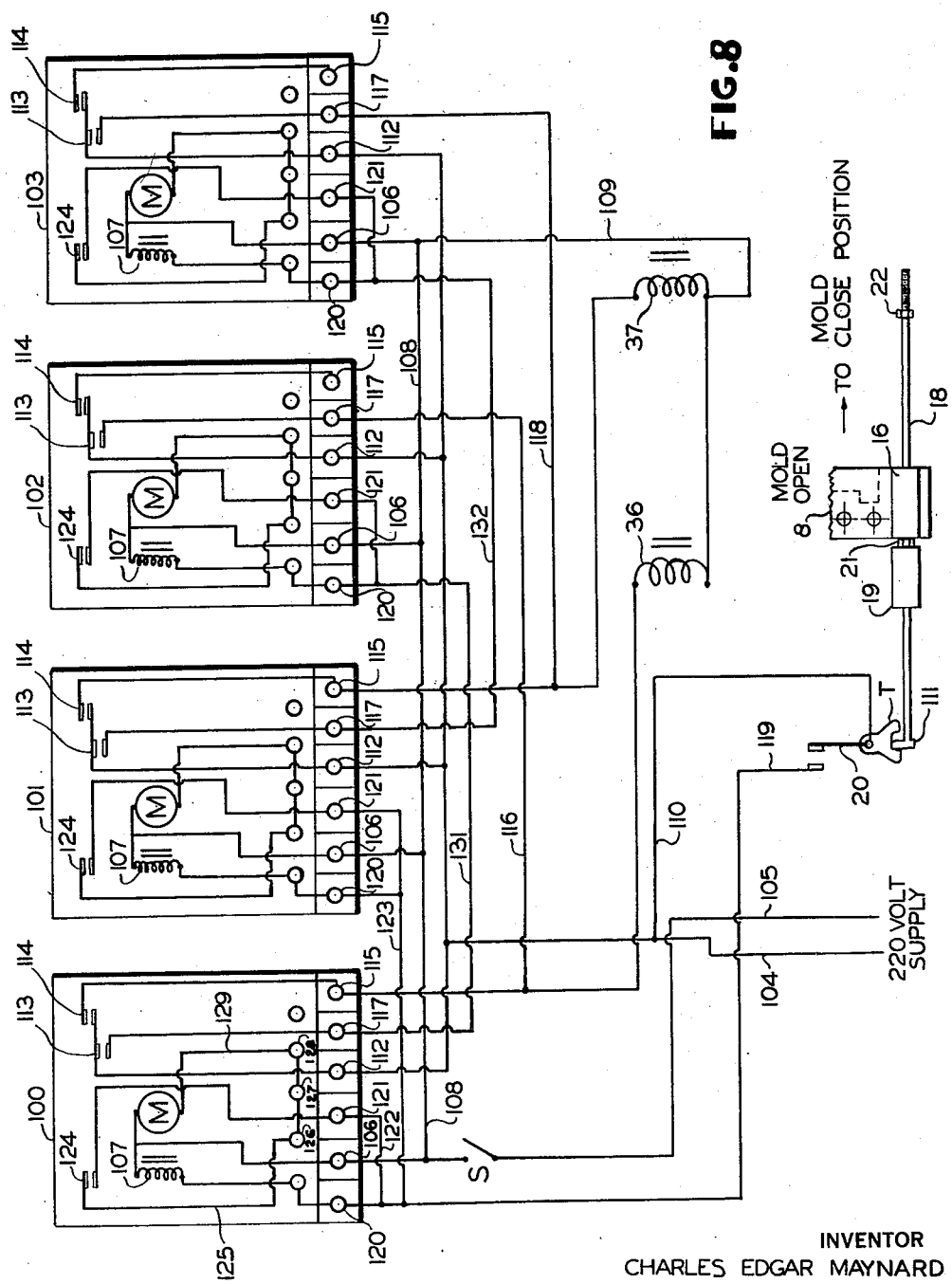
Fig. 8 is a wiring diagram of an electrical system to obtain the time intervals referred to in my method disclosure.

A suitable wiring diagram is shown in Fig. 8. In this wiring diagram the internal wiring of four conventional automatic time control devices or "timers" is indicated within the rectangles 100, 101, 102 and 103. Power is supplied to the timers through the external wiring shown below these rectangles, in which line 104 is one side of the power line and line 105 is the other.

Current from line 105 goes to each timer and to one side of the solenoids of the solenoid operated air valves 36 and 37. To do this, current from line 105 goes through switch S, which is a toggle switch and the master switch for the entire unit, thence through terminal 106 of each timer to one side of solenoid 107 of each timer and one side of motor M on all timers; current also goes to one side of each air valve solenoid 36 and 37 through lines 108 and 109.

Current from line 104 goes through line 110 to one side of limit switch 20 which is open when the mold is open, as will later be explained. Current from line 104 also goes to terminal 112 and movable contact or switch 113 on each timer. With the mold open none of the timers are energized since no current goes to one side of solenoid 107 or motor M on any timer because limit switch 20 is open. But contact 114 is normally closed linking terminals 112 and 115 on timer 100 and timer 101. This causes current from line 104 to go from terminal 112 to terminal 115 and thence to air valve solenoids 36 and 37, each air valve solenoid being fed by a different timer. Timer 100 supplies air valve solenoid 36 and timer 101 air valve solenoid 37.

Line 116 also connects to terminal 115 on timer 100, but goes to dead terminal 117 on timer 102. Line 118 also connects to terminal 115 of timer 101, but goes to dead terminal 117 on timer 103.

When the circuit is completed to air valve solenoids 36 and 37, it causes the air valve solenoids to energize and allows steam to flow into the mold. The steam is on all the while the mold is open. When the mold starts to close, limit switch 20 is closed by a mechanical linkage from the movable half of the mold. A trip T on limit switch 20 is moved by projection 111 on movable rod 18, see also Fig. 1. Movable rod 18 slides through bushing 19 which is fastened to base 1 of the injection molding machine as shown in Fig. 1. A projection 16 on movable mold half 8 contains a hole 17 (Fig. 3) through which rod 18 slidably fits so that the mold may travel back and forth in its opening and closing operation without moving rod 18 until projection 16 abuts fixed stop nuts 21 or 22 and forces movement of rod 18 to work trip T on limit switch 20. Rod 18 is threaded at the points where stop nuts 21 and 22 force the final portion of the mold travel to trip limit switch 20. This allows for adjustments in the "idle" or "lost" motion of the mold before utilizing mold travel for tripping switch 20. Closing the limit switch 20 causes current from line 104 to go to timer 100—through line 110 to limit switch 20 and by line 119 to terminal 120 and to terminal 121 by line 122—and to timer 101 by line 123. This completes a circuit through solenoid 107 of timers 100 and 101 and causes solenoid 107 to close contact 124 and holds contact 114 closed by the same action as closed contact 124. Motor M is started when contact 124 is closed.

For motor starting, current from 121 goes to contact or switch 124, then to motor M by line 125 through three center terminals 126, 127, 128 and line 129. Current from line 105, the other side of the power line, is already applied by switch S being closed, thus completing the motor starting circuit. The same action starts motor M of timer 101 in a like manner.

All of the above action causes timers 100 and 101 to "time out." In operating these conventional timers, the operator sets the timer for the desired time interval and when the synchronous motor M starts it drives a cam arrangement in the timer until the cams trip contacts 124 and 114 after the desired interval of time. A scale on the face of the timer is calibrated for setting the timer. Contacts 124 and 114 are opened. By opening contact 124 the motor in the timer is stopped. Opening contact 114 de-energizes air valve solenoid 36 and 37 and cold water, or fluid, goes into the mold as explained in conjunction with the piping diagram of Fig. 6. A spring arrangement 130 (Fig. 11) resets the cam shaft in the timer when the motor M stops and the timer is ready for the next time cycle of operation.

Connection is made, when timers 100 and 101 (Fig. 8) trip between their terminals 112 and 117 by the closing of contact or switch 113. This causes current to go from power line 104 through terminal 112 and down to terminal 117, thence to terminal 120 and 121 on timers 102 and 103— by line 131 for timer 102 and by line 132 for timer 103.

This action, just described, causes timers 102 and 103 to start their timing cycle. Since there is no connection on terminal 115 of timers 102 and 103, there is no current going out.

Timers 102 and 103 are allowed to run out for the length of time set on their dials. When they trip, motor M in each of these timers is de-energized and stops and contacts 113 are closed in each. This causes current from power line 104 going through terminal 112 on timers 102 and 103 to go through contact or switch 113 to terminal 117 and thence to air valve solenoids 36 and 37—by line 116 to air valve solenoid 36 and by line 118 to air valve solenoid 37.

This action causes the air valve solenoid to energize, shutting cooling fluid off and turning steam or heating fluid on. Steam stays on for the remainder of the cycle until the mold is opened, the movable half of the mold opening the limit switch 20 and allowing the action of spring 139 in the timer mechanism to reset the timers 102 and 103.

Figure 9:
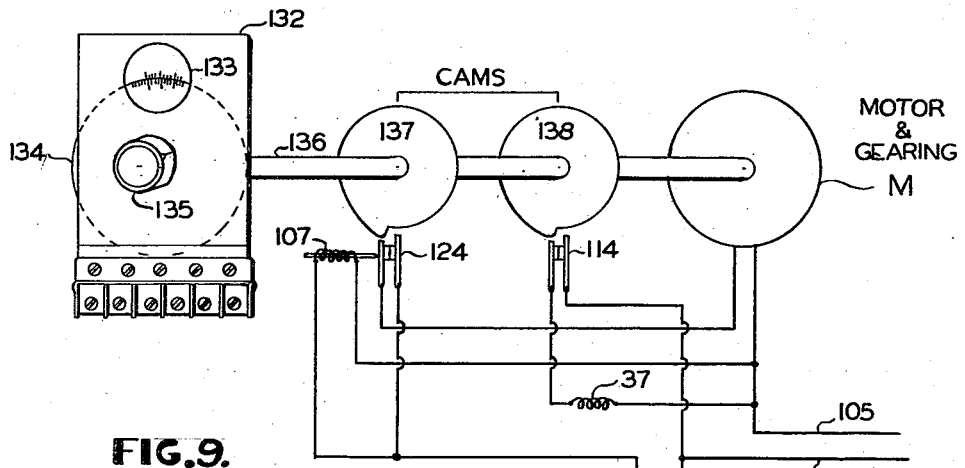
Fig. 9 is a diagrammatic exploded view of one of the automatic timing devices, or "timers," indicated in the wiring diagram of Fig. 8.

The exploded view of one of the "timers" (Fig. 9) indicates the operative sequence of one "timer" as related to the control system. The front plate 132 has dial face 133 whereon setting dial 134 may be seen. Front plate 132 also carries setting knob 135 and a series of terminals as indicated in the internal wiring diagram of Fig. 8. A timing shaft 136 carries thereon two cams 137 and 138 and is driven by motor M which has a built in gear reduction unit as will later be described. Cams 137 and 138 operate to open switches 124 and 114 respectively. By opening switch 124 the motor M in the timer is stopped. Opening switch 114 de-energizes air valve solenoid 37 and allows cooling fluid, or water, to go into the mold. Both switches are closed by the closing of limit switch 20 when the mold closes as explained above. Solenoid 107 in the timer is energized when limit switch 20 closes and solenoid 107 holds switch 124 closed. Switch 114 is normally closed. This wiring diagram is merely to show the operation of a timer related to the control system. The wiring diagram of Fig. 8 shows completely how the four timers are integrated to function together in the control system. All four of the electrical "timers" have a well known form of control motor. A small alternating current, synchronous motor M in each "timer" set into action as above described, drives, through gear reduction mechanism including an electromagnetically-operated clutch, timing shaft 136 having thereon means for actuating the switches of the system at a predetermined time after the control motor M is started. The timing shaft 136 is turned in one direction only by the control motor M and, when so turned, winds up a spring 130 (Fig. 11) which is later used to return the shaft to its initial position, when the clutch is released by de-energization of its electromagnetic-operating means on opening the control motor circuit; to interrupt the transmission between the shaft 136 and the control motor M.

Figure 10:
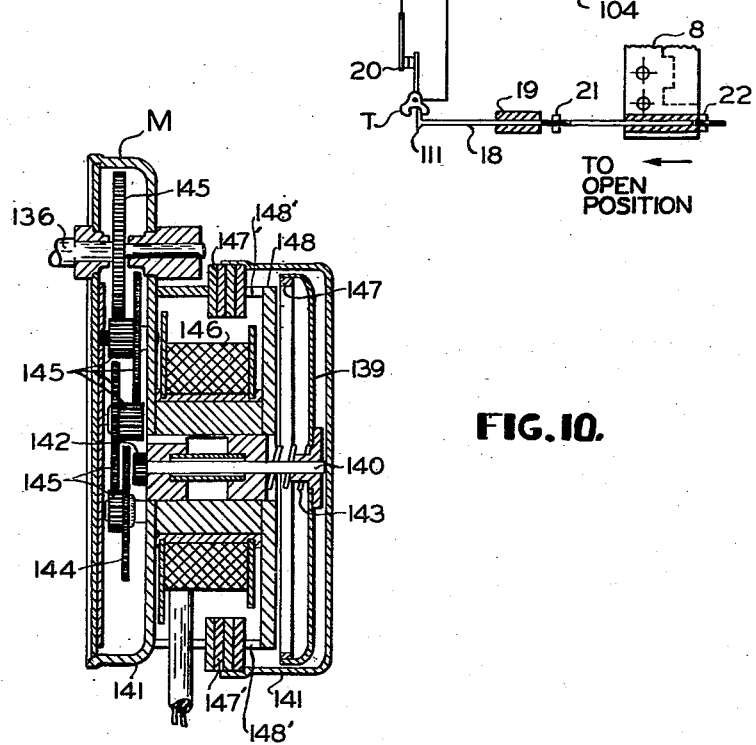
Fig. 10 is a cross section of the motor and gearing of the "timer" of Fig. 9 showing the control motor, its timing shaft, gear reducing mechanism, and clutch.

Motor M is shown in section in Fig. 10. The rotor 139 is fixed to one end of a shaft 140 which is rotatably mounted in bearings in the casing 141 and which has fixed to the other end a pinion 142. This shaft is axially movable. A spring 143 moves it to the right into, and yieldingly holds it in the illustrated position, in which the pinion 142 is out of mesh with a gear 144 of a gear reduction mechanism. The latter comprises the pinion 142, the gear 144 and a train of gears 145, which are mounted in casing 141 and drive a timing shaft 136. When the field 146 of the timing motor M is energized, the rotor 139 is drawn by magnetic attraction to the left until the magnetic ring 147 of the rotor comes into line with the pole piece member 148. As a result, the pinion 142 will be moved into mesh with gear 144, and as the rotor rotates, the shaft 136 is turned at a definite time rate, for example—one revolution per minute. The pinion 142 and gear 144 constitute a clutch operable by electromagnetic means comprising the field 146 and armature 139 of the timing motor. The details of the motor construction are not important to the present invention. The motor construction may, for example, be substantially the same as is shown in the United States Patent No. 1,996,375 dated April 2, 1935 to which reference is made for a more complete disclosure of the motor. As more fully disclosed in said patent, a shaded pole winding comprising short circuited copper rings 147' surrounding the polar projections 148' is used for starting purposes.

Figure 11:
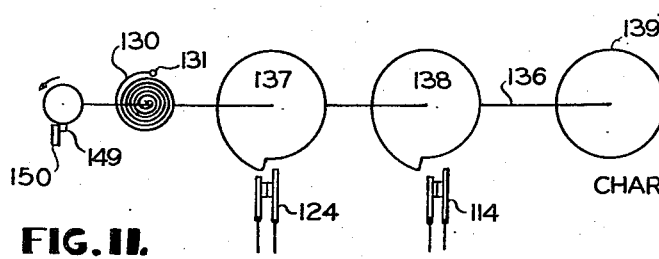
Fig. 11 is a diagram showing the operative relation of the internal parts of the "timer," the control motor, timing shaft, and the switches actuated thereby.

The timing shaft 136, and the switch-opening means thereon, are shown in diagrammatical form in Fig. 11. This shaft, as shown, carries two cams 137 and 138 for opening the switches 124 and 114 respectively. The shaft 136 can be turned in a clockwise direction by the timing motor until a stop 149, movable with the shaft, engages the right hand side of a fixed abutment 150. Spring 130, connected at one end to the shaft and at the other end to a stationary member 131, is adapted to be wound up by the clockwise rotation of the shaft. Then, when the motor field 146 is de-energized, the magnetic pull on rotor 139 is broken and spring 143 moves it into the position illustrated in Fig. 14, disengaging pinion 142 from gear 144, whereupon the spring 130 will turn shaft 136 in a counterclockwise direction back into the illustrated position, wherein the stop 149 abuts the left hand side of abutment 150.

The fully automatic machinery disclosed above is the most efficient way now known to me to practice the new method invention of injection molding commercially. However, the new method is one that can be practiced by various sorts of apparatus—even by hand tools. For instance, the equipment shown in the diagram of Fig. 4 may be all manually operated molding equipment and the heating and cooling of the mold in accordance with the new temperature variation line of Fig. 5 may be accomplished by any conduction, convection or radiation means, such as electrically, direct flame, or immersion in a hot fluid for the heating, and the use of air, refrigerated fluids or solids, or other means for the cooling.

The method of my invention may also be practiced by using hand adjustments to the conventional automatic injection molding machine. Most of these routine machines have means to raise and lower mold temperature and means to time the periods for the automatic molding cycle. These prior art variations are consistent with trying to, or holding, the mold temperature constant and with the variations in size and material of the products being molded, each of which obviously do not require the same period timing in its molding cycle. So the prior art may well have a machine that the molder can use by hand adjustments to vary the mold temperature to practice my invention when the molder is given the disclosure of my new method to guide his practice.

In its broad scope the invention is such as one can carry out by the use of mere "tools." In this respect when the conventional automatic injection molding machine is used per se but arranged to manipulate itself as taught by my disclosure it may be considered, not as a full automatic machine, but a power tool useful to perform the new method.

Having fully described my method invention, it is to be understood that I do not wish to be limited to the details herein set forth, but my invention is of the full scope of the appended claims.

I claim:

1. The improvement in the art of molding thermo-plastic material by the injection molding method such as commonly includes the following cycle of steps: closing the mold, injecting the heat plasticized material under pressure to fill the closed mold, holding the mold closed and holding the material in the mold under hydraulic pressure long enough for it to set to molded form retaining condition, opening the mold, removing the piece and repeating such steps in their cycle all by the use of an injection holding machine; which improvement consists in heating the mold to a temperature above the setting temperature of the heat plasticized material when the material is injected into the mold to avoid setting any portion of the material until the mold is filled and thus avoid weld lines, holding such high mold temperature until the mold is filled and all portions of its contents are in quiescent condition for setting, artificially chilling the mold to start the mold temperature falling toward the setting temperature of the material, substantially at the time the injection step is finished and continuing such chilling step to lower the mold temperature substantially below the temperature at which the material will begin setting in the mold, holding the mold closed and its contents under hydraulic pressure for the time required for setting such material to molded form retaining condition, which is necessarily much longer than the sum of the time periods of all other steps in the aforesaid cycle, beginning another mold heating step when the mold is near its said low chilling temperature, carrying on said heating step for a substantial part of said material setting period of time, opening the mold at the end of such setting period, removing the molded material, and closing the mold, while continuing said mold heating step to continue the temperature rise in the mold during the time periods of said mold opening step, said material removing step and said mold closing step to have the mold heated and ready at such aforesaid high temperature to start the injection step of the next cycle at the high temperature of the mold and substantially as soon as the last mentioned mold closing step is completed.

2. The method of injection molding thermoplastic material which consists in heat plasticizing the material for mold injection, heating an injection mold above the temperature at which the plasticized material can set when injected, injecting the material into the mold under the conditions of such high mold temperature, causing said mold temperature to start dropping rapidly by artificial chilling, as soon as the mold is filled, to and below such material setting temperature, holding the mold closed and its contents under hydraulic pressure long enough for the material to set enough to maintain its molded form, continuing said artificial chilling of the mold during the first, and for a substantial part, of said material setting time and then heating said mold for the remaining and during another substantial part of said material setting time, such heating time and action being long enough to bring the molding surfaces from their low chilling temperature back to a temperature near to the plasticizing temperature of the material, opening such mold and removing the molded contents before it is heated enough to be replasticized, closing the mold to start another molding cycle, and continuing the rise of mold temperature during the mold opening and closing steps, by said heating step to have the mold at the aforesaid high molding temperature before or at substantially the same time as the mold closing step is finished for the following injection step to begin to repeat the cycle as pointed out above.

3. The method of molding plastics of the ornamental kind which set by cooling and commonly known as thermo-plastics to distinguish them from the thermo-setting materials which are not of such generally ornamental character as the thermo-plastic kind, the method being carried out by the use of an injection molding machine and which method consists in the following steps to shorten the time of each cycle and substantially increase the production output of such a molding machine, first raising the temperature of the material and the temperature of the injection mold of the machine to their molding temperatures and making the temperature of the mold substantially higher than the setting temperature of the material, while maintaining such temperatures, injecting the material to completely fill the mold, as soon as the mold is filled and while material is held under its injection pressure, causing the mold temperature to fall rapidly by artificially chilling the mold to a temperature substantially below the setting temperature of the material, before the material sets enough to keep its molded form, starting to heat the mold up from its low chilling point early enough to have it near the setting temperature of the material when the latter has set enough for removal, promptly opening the mold, removing the molded material, while the mold temperature is still rising, closing the mold, and continuing the mold heating to carry its temperature quickly from that of the mold opening time to that point of mold temperature first mentioned to receive a new injection filling and repeat the cycles of steps pointed out above.

CHARLES EDGAR MAYNARD.

REFERENCES CITED

The following references are of record in the file of this patent:

UNITED STATES PATENTS

| Number | Name | Date |
|---|---|---|
| 2,043,584 | Husted | June 9, 1936 |
| 2,359,013 | Tucker | Sept. 26, 1944 |

OTHER REFERENCES

Tenite, Tennessee Eastman Corp., published Mar. 4, 1946, page 33.

Certificate of Correction

Patent No. 2,535,436

December 26, 1950

CHARLES EDGAR MAYNARD

It is hereby certified that error appears in the above numbered patent requiring correction as follows:

In the grant, lines 2 and 14, and in the heading to the printed specification, line 6, name of assignee, for "The Pro-Phy-Lac-Tic Brush Company" read *Pro-Phy-Lac-Tic Brush Company*; column 11, line 12, for "holding" read *molding*;

and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*